3,318,747
METHOD OF MAKING A FLUID SEPARATION UNIT OF A THREE PLY FOLDED SHEET
Thorpe Dresser, Markham, and Reading B. Smith, Flossmoor, Ill., assignors to Sinclair Research, Inc., Wilmington, Del., a corporation of Delaware
Original application Oct. 6, 1961, Ser. No. 143,323, now Patent No. 3,266,223, dated Aug. 16, 1966. Divided and this application Jan. 13, 1966, Ser. No. 535,634
3 Claims. (Cl. 156—204)

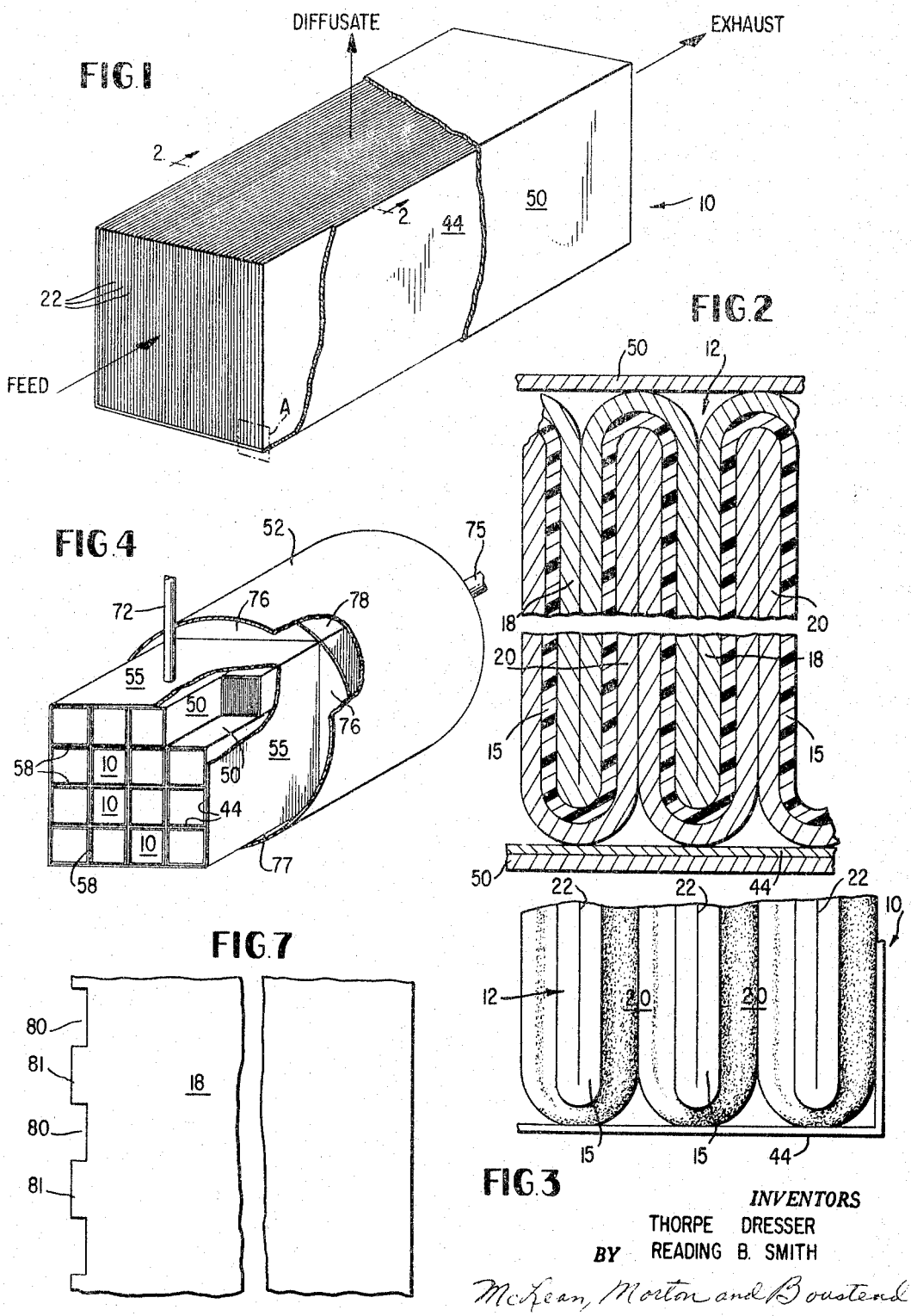

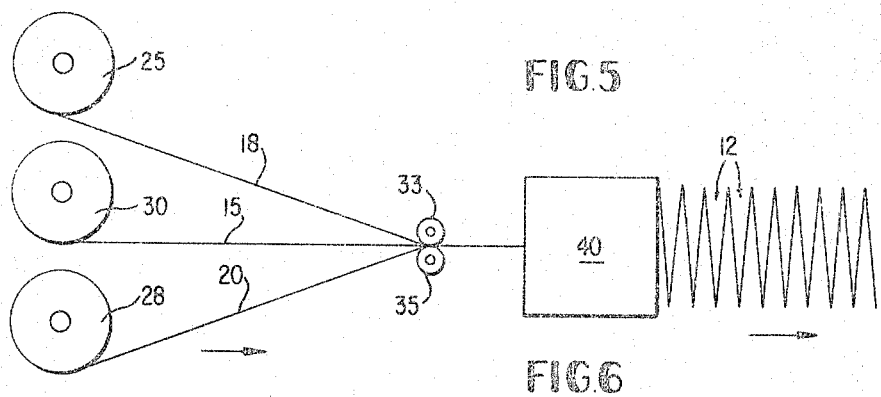
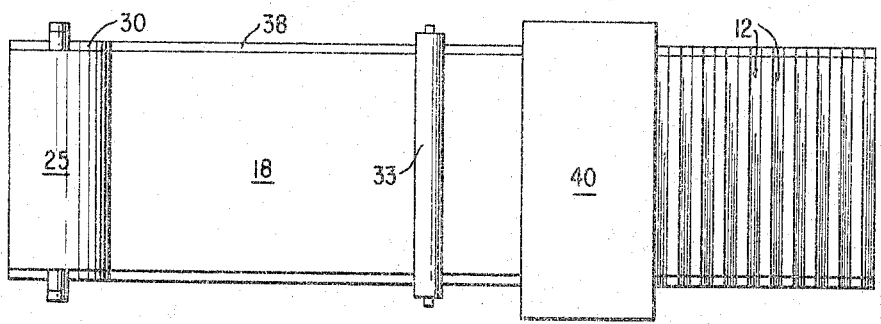
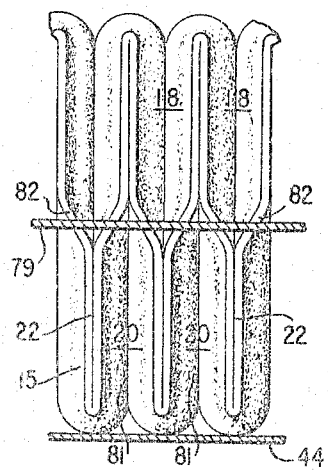
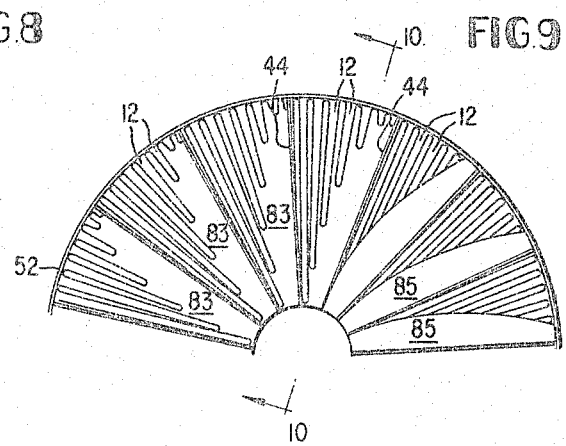
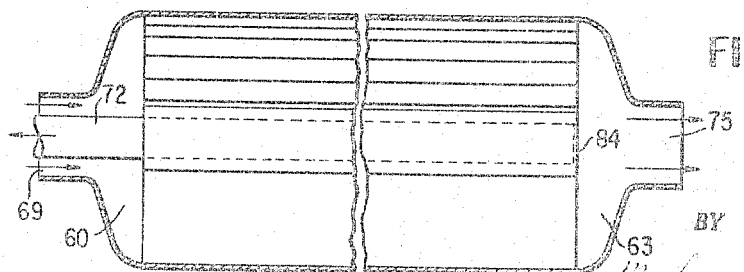
INVENTORS
THORPE DRESSER
READING B. SMITH United States Patent Office 3,318,747
Patented May 9, 1967

This invention relates to a method of manufacturing apparatus for the separation of components of a fluid mixture.

This application is a division of applicants' copending application Ser. No. 143,323, filed Oct. 6, 1961, now Patent No. 3,266,223, granted Aug. 16, 1966.

The separation of components of a homogeneous fluid, particularly a gas, by methods not employing temperature changes or chemical reactions has been considered for some time and various types of separation by means of permeable, semi-permeable or other membranes or films have been suggested. Such methods are based on differences in the chemical affinities of the components of the fluid mixture or on differences in the size of molecules or other particles in the mixture.

Mixtures such as hydrogen-methane; hydrogen-hydrocarbon; helium-hydrocarbons; helium-air, etc.; etheneethane-propane; olefins-alkanes; and diolefins-alkanes are frequently encountered. In the first four mixtures particularly, the desired molecules are far smaller than the remaining component or components of the system. The first four systems have great commercial potential because the existing processes for their separation are basically chemical in nature and are relatively expensive.

Permeation of the desired smaller molecules through the lattice structure of thin films are membranes has been suggested as a mode of separation but prior art devices have not given effective, commercially useable, permeation per unit volume of the apparatus. Since the permeation rate is inversely proportional to the thickness of the film or membrane, and is proportional to the pressure difference between the feed and diffusate sides of the membrane, almost contradictory properties are required in the membrane: it must be thin and almost perfectly free from holes and it must be strong and rupture resistant. This invention provides for mechanical support of the entire film surface so that relatively high pressure may be applied without danger of rupture to the thinnest film which can be manufactured substantially free of holes.

Certain definitions should be agreed upon in describing permeation in relation to similar processes. Diffusion is a process wherein molecules move among one another in a bulk system because of their common kinetic motion. Effusion is a process wherein molecules move through a membrane, in which they are either insoluble or slightly soluble, through holes or channels of dimensions relatively large as compared to molecular size and approximately $\frac{1}{10}$ of the mean free path of the molecules. Permeation is a process wherein molecules move through a membrane, in which they are usually slightly soluble, through passages or interstices in the crystal lattice approximating the molecular size. This invention exploits a permeation phenomenon and generally involves films approximately 1 mil thick, which is about 10,000 to 100,000 times the dimensions of the diffusing molecule. Certain elements in the apparatus of this invention will be described as "pervious." These elements have a structure which provides discontinuities on the order of thousands of times the size of the molecules of the feed mixture and freely permit passage of all components of the feed mixture. Certain other elements will be described as impermeable or impervious, that is, preventing the passage of any components of the feed mixture.

There are two types of permeation: flash permeation and differential permeation. This nomenclature is analogous to that employed in distillation. In flash permeation, homogeneous compositions exist on each side of the permeable or semi-permeable film. Such a system requires perfect mixing on each side and is generally achieved only in small equipment, such as in experimental apparatus. In differential permeation no mixing occurs on either side of the film. The fluid composition on the upstream side changes continuously along the film. The diffused gas, because of low mass flow rates, is removed from the vicinity of the film by a form of laminar flow before any mixing occurs. This situation is similar to differential distillation where the liquid composition changes continually and the vapor is removed as soon as it forms.

The apparatus of this invention provides for use of a multiplicity of units which can be considered as pockets of membrane with spaced-apart sides, the ends of the elongated pockets being sealed and the top open for removal of diffusate. The pockets are arranged for flow of the feed mixture in a confined path along the outside of the pockets. The pocket of membrane or film is fabricated from sheet film having the desired lattice structure and chemical affinities, chemical stability, film-forming characteristics, etc. Resin technology has provided a number of suitable thermoplastic materials. The film may be any of these plastic sheets such as polyethylene, polyester resin, nylon, polytetrafluoroethylene, fluorinated ethylenepropylene copolymer, polystyrene, and the like, in which the number of discrete holes greatly exceeding the mean effective diameters of the molecules being processed is greatly minimized.

The sides of the pockets may be spaced from each other and the pockets themselves spaced from each other in a number of ways. The film sheet may be embossed as by forming in a hot die or roll, to form pyrimidal, hemispherical, herringbone, and similar patterns, either symmetrical or unsymmetrical, for the purpose of increasing effective area per unit of projected area, and/or causing the desired spacing. Preferably, spacing sheets are used, and when the manufacturing method of this invention is employed the fabrication of membrane units with spacing sheets is remarkably simplified.

The spacer sheet is pervious to the fluid being processed and may be any formulation of fibers coming under the general description of "paper" or "cloth," in which the fibers are cellulose, glass, or metal derivatives. It is primarily intended to separate the alternate layers of film, provide a passage for the material in processing and transmit the pressure stresses mechanically, directly and/or indirectly, ultimately to the walls of the pressure vessel containing the membrane unit. The spacer sheet may be formed of sintered or adhering particles, as found in sintered metal, glass, or ceramics, but if used for the pocket separator, involves more complicated assembly techniques. The cloth or paper generally used in this invention is much more pervious than the film so that passage of the gas edgewise of the separator sheet introduces only a minor pressure drop in the system between the feed inlet and the exhaust feed outlet.

No particular limitation is made in the chemical or physical structure of the film or separator sheets. Each system it is desired to separate will have somewhat differing requirements in this regard. However, the spacer sheet will preferably have pores which are unobvious to the naked eye, say, no larger than about 5 microns. It is recognized that some chemical and/or physical effect on the film may occur as a result of contact with the material being separated. This effect is of paramount importance in liquid systems because the films frequently undergo major changes in micro and macro dimensions. It is of less importance when processing gases, but at higher concentrations (pressures) some effect may occur when processing such materials as olefins and diolefins. In some cases advantages can be gained by the introduction of extraneous components in the gas in order to obtain a desirable modification of the film to promote permeation rate and/or increase the separation effect.

The invention will be better understood by reference to the accompanying drawings which are designed to be illustrative only and not limiting and in which FIGURE 1 is a perspective view of a diffusion unit showing the direction of feed, exhaust and diffused fluid movement;

FIGURE 2 is an enlarged cross-sectional view along the line 2—2 of FIGURE 1;

FIGURE 3 is an enlarged view of the end corner portion "A" of the diffusion unit of FIGURE 1;

FIGURE 4 is a perspective fragmentary view of a separator assembly using sixteen of the diffusion units of FIGURE 1;

FIGURE 5 is a schematic side view illustrating part of a method for making the diffusion unit of FIGURE 1;

FIGURE 6 is a plan view of the schematic of FIGURE 5;

FIGURE 7 is a representation of a blank used in forming a modification of the unit cell of FIGURE 1;

FIGURE 8 is a view, somewhat similar to FIGURE 3, of the unit cell formed with the blank of FIGURE 7;

FIGURE 9 is a vertical end view, partly cut away, of a separator assembly using a different arrangement of unit cells; and FIGURE 10 is a horizontal cross-sectional view along the line 10—10 of FIGURE 9.

The unit cell 10 is composed of pockets 12 comprising a film 15 which is permeable to a gas or liquid component to be separated from the feed mixture. To form the pocket the sides of film are separated from each other by the fluid pervious inner spacer 18 while the pockets are separated from each other by the fluid pervious outer spacer 20. The ends of the pocket are formed of film sealed, adhesively or by heat-sealing methods, to form the seam 22. It will be noted that inner spacers 18 are isolated by means of the inner sides of the pockets and the seams 22 from any contact with the outer spacers 20, thereby providing, due to the fluid pervious nature of the spacing material, two separated fluid passageways, one through 18 and one through 20.

The configuration of the unit cell will be more easily understood by describing the mode of manufacture illustrated in FIGURES 5 and 6. FIGURE 5 shows three rolls of sheet material. Upper roll 25 and lower roll 28 contain the fluid pervious sheet material which will become inner and outer spacers 18 and 20. Middle roll 30 contains the permeable film. Each roll may contain, say, 3000 linear feet of the sheet material. Film 15 and outer spacer 20 are generally of the same width, say 72 inches, which, in the final unit cell, will be the length of the cell. The inner spacer 18 is somewhat narrower, for example, 71 inches. Sheets 18, 15 and 20 are brought together by rollers 33 and 35 to produce a three-ply sheet having a two-ply selvage portion 38. In the view of FIGURE 6, this selvage portion is film on top with outer spacer on the bottom. Adhesive may be applied to the film side of this selvage after it leaves the rollers or the selvage may be heat sensitized. The three-ply sheet passes to folding apparatus 40 which may be of any type known to the art to produce the three-ply pockets 12. The series of attached pockets passes in the direction of the arrow to a compression device which squeezes the sides of the pockets together. Where adhesive has been applied to the selvage, this compression also forms the seams 22. Alternatively, the compression is performed under heat sufficient to heat-seal the selvage film. The presence of the outer spacer sheet 20 prevents adjoining pockets from sealing together. The seam need not be extraordinarily strong; in use, the pocket is subjected to greater pressure on the outside than the inside, so that the strain or stress on the seam is minimized. The pockets are kept and used in the compressed state to insure firm support of the film by the spacing members. The sides and bottom of the unit cell pocket assembly are preferably contained within a fluid impermeable shield 44 which can be made of metal sheet, etc. As indicated by the arrows of FIGURE 1, the fluid mixture to be separated is fed against the sides of the pockets 12 in the unit cell, passing lengthwise through the permeable outer spacer 20 to the opposite, exhaust end. The feed is confined to the areas between the outside of film 15 and the shield 44 and is confined in general to the space occupied by pervious member 20. A high pressure is maintained on both the feed and exhaust ends of the unit cell causing the component to which the film 15 is permeable to pass through the film into the fluid-pervious inner spacer 18 and thence upward through the open upper end of the pocket as the diffusate.

Advantageously, the entire unit cell, except for the front and rear ends, is enclosed in a gas-pervious material 50 such as cloth, heavy paper or even a rigid material which acts as a wrapper for handling and also as a separator for units in the separator assembly shown in FIGURE 4. Alternatively, the spacing material 50 may merely be flat sheets placed between the cells. These members 50 are isolated from the feed fluid by the impervious barrier 44 but are in contact with the interior of the pockets 12 and therefore with the diffusate by means of the open upper ends of the cells and the inner spacer material 18.

A plurality of cells, such as the sixteen cells shown in FIGURE 4, may be placed in the generally cylindrical pressure vessel 52. The separator assembly is covered on sides and bottom with a gas impermeable shield 55 such as sheet metal, and at the junctures of the unit cells 10 a gas-impermeable tape 58 is placed over the pervious members 50 to prevent flow of unseparated gas through these members.

The ends of the pressure vessel are capped generally with hemispherically shaped members 60, 63 (FIG. 10). The pressure vessel is provided with an inlet 69 for fluid to be separated, with an outlet 72 for diffused fluid, and an outlet 75 for exhaust undiffused fluid. Gas impermeable support members 76 block the space left between the separator assembly and the pressure vessel. These members serve not only to hold the separator assembly rigid in the pressure vessel but also divide the space between assembly and vessel into the two fluid-tight compartments 77 and 78, the former being in communication with the feed inlet and the latter being in communication with the exhaust fluid outlet. In operation there is a pressure difference between the compartments and across the support members 76, equal to the pressure drop across the length of the unit cell. The outlet 72 for diffused gas penetrates the shield 55 to put the mouth of this outlet in contact with the permeable member or wrapper 50. Thus diffused fluid passes from the open upper end of each pocket 12, into and upwardly through the members 50, passing around the impermeable shield 44 of the unit cell above it, finally reaching the upper layer of pervious wrapper 50 and the underside of shield 55 and passing to the outlet 72. It will be readily seen that the entire unit cell arrangement provides for minimum "empty space" into which the fragile membranes may be deformed, but rather provides for mechanically balancing out the pressures exerted on the film.

FIGURE 8 shows a modified pocket arrangement for use in a unit cell. In this arrangement an upper portion of the sides of the film pockets is left open as well as the upper end. FIGURE 8 shows the forward end of the group of pockets; the rear end may be similar to this end but preferably conforms to the front end shown in FIG- URE 3. A fluid-impermeable member 79 is provided in contact with the unit cell at about the mid-section and spans the distance between the unit cell and the end of the pressure vessel to confine feed fluid to the bottom portion of the cell and diffused fluid to the top.

The cell of FIGURE 8 may be easily manufactured using the same film roll as shown in FIGURE 5 but using spacer sheets having serrated edges as shown in FIGURE 7. Both the inner spacer 18 and the outer spacer 20 are cut with a serrated pattern, and are laminated 180° out of phase with each other with the film 15. The cut out portions 80 of the serrations are the same depth as the selvage 38 of FIGURE 6 and are generally longer than the tab portions 81 in order to provide the overlapping film portions 82 shown in FIGURE 8. The folding machine 40 folds the three-ply sheet midway in the cut-out portions 80 and tab portions 81, then, when heat sealing is performed on the folded assembly, film unites with the fold of film adjacent to it on both sides through the cut-out portions of both inner and outer spacing sheets to give the pocket arrangement shown in FIGURE 8.

FIGURES 9 and 10 show an arrangement of "unit cells" which provides more complete utilization of cylindrical pressure vessel volume and a close approximation to counter-current flow, approaching maximum purity of diffusate for a given pressure difference.

The unit cell is composed of pockets varying in height to accommodate themselves to a sector of the cylinder and with side seams so arranged as to direct the open ends of the pockets inward toward the axis of the cylinder. The units may or may not be provided with the impermeable shields 44 and the permeable wrappers 50, not shown in FIGURE 9. The diffusate gathers in the spaces 83, the size of which is exaggerated in FIGURE 9. The outside wall 52 of the pressure cylinder provides the remainder of the impermeable barrier for containing the fluid to be separated on the outside of the pockets. The cylinder is provided axially and concentrically with the diffusate line 72 which is composed, in the region where it contacts the pockets, of fluid pervious material and where it passes through the head, 60, of the cylinder, of a fluid impervious material. Such impervious material also provides the end, 84, of the diffusate line 72. The inlet, 69, for the feed fluid to be separated comprises the annular space around the diffusate line 72. The front and rear ends of the separator assembly are provided with the masks 85 which are placed over the spaces 83. Exhaust fluid leaves the pressure cylinder by line 75.

It will be obvious to one having ordinary skill in the art that a number of other shapes and arrangements of the unit cells are possible.

Starting with a sheet of, say, polytetrafluoroethylene film 6 feet wide, 3000 feet long and 1 mil thick, a sheet of paper 6 feet wide, 3000 feet long and 1.5 mils thick is placed on one side of the film and a sheet of paper 5'11" wide, 3000 feet long and 1.5 mils thick is centered on the other side of the film. The assembled sheets are then folded together on 12-inch folds, to make a unit cell comprising 3000 layers of film. The ½ inch exposed selvage edge 38 of the film on the inner side is made pressure sensitive or adhesive so that when assembled this edge is sealed to provide 1500 pockets, 12. An impermeable metal sheet or foil, 44, is placed around the sides and bottom of the unit and the package is wrapped in relatively thick (0.010") paper, 50, to provide a conduit for the diffused gas. The packages are assembled into a battery of four pressure cells, each pressure cell containing 16 unit cells. At each end of the pressure cell is a sheet metal sealing and thrust support grid 58 which seals off the outer wrappers from the inlet gas and serves to transmit the thrust due to pressure-drop through the unit cells to the vessel wall. The rectangular package of unit cells is contained in a prismatic sheet metal box, 55, 4' x 4' x 6' contained in the pressure cell. This sheet metal box serves to separate the permeated gas from the inlet and outlet gas. Impervious supports 76 and diffusate line 72 are put in place in the pressure vessel and the cell ends are closed by elliptical heads.

In operation, a 50% hydrogen-50% methane mixture feed gas is admitted by line 69 to space 77 at a pressure of about 500 p.s.i.a. A pressure of about 450 p.s.i.a. is maintained at the exhaust gas outlet 72 and in the downstream chamber 78. The feed passes lengthwise on the outside of the pockets taking a pressure drop between inlet and outlet of about 50 p.s.i.a. Unpermeated feed leaves the unit through the downstream elliptical head 63. Permeated gas, which comprises a mixture of about 75% hydrogen and 25% methane leaves by line 72 at a pressure of about 50 p.s.i.a.

Thus although a differential of about 450 p.s.i.a. exists across the film or membrane, the pressure is transmitted and balanced mechanically, preventing rupture of the film or the paper packages. Thus this invention meets the requirement for large surface area per unit volume while providing a relatively simple construction.

It is claimed:

1. A method for making a fluid separation apparatus which comprises forming a three-ply sheet by placing on a first fluid pervious sheet material a film of material more permeable to one component of a fluid to be separated and less pervious to another component of the fluid, of the same width as said first pervious sheet, and centering on the film a second sheet of fluid pervious material having a smaller width than said film, to leave a film selvage, folding said three-ply sheet across its width into a multiplicity of simple folds, and compressing said folded sheets and adhering adjacent layers of film to each other.

2. The method of claim 1 wherein an adhesive is applied to the film side of the selvage before said compressing step, said adjacent layers of film adhering to each other upon said compressing step.

3. The method of claim 1 wherein the film side of said selvage is heat sensitized before said compressing step, said compressing step adhering said adjacent layers of film to each other.

References Cited by the Examiner
UNITED STATES PATENTS 2,569,243   9/1951   Kovacs _____ 55—500 X
2,801,671   8/1957   Vaughn et al. _____ 156—204

EARL M. BERGERT, *Primary Examiner.*

PHILIP DIER, *Examiner.*